US012650869B2

(12) United States Patent
Smith et al.

(10) Patent No.: US 12,650,869 B2
(45) Date of Patent: Jun. 9, 2026

(54) SERVER AND APPLICATION MONITORING

(71) Applicant: SITA Information Networking Computing UK Limited, Hayes (GB)

(72) Inventors: Mark Smith, Hampshire (GB); Adinarayana Kadiyam, Hayes (GB)

(73) Assignee: SITA Information Networking Computing UK Limited (GB)

( * ) Notice: Subject to any disclaimer, the term of this patent is extended or adjusted under 35 U.S.C. 154(b) by 989 days.

(21) Appl. No.: 17/774,742

(22) PCT Filed: Nov. 18, 2020

(86) PCT No.: PCT/GB2020/052935
§ 371 (c)(1),
(2) Date: May 5, 2022

(87) PCT Pub. No.: WO2021/099774
PCT Pub. Date: May 27, 2021

(65) Prior Publication Data
US 2022/0405115 A1 Dec. 22, 2022

(30) Foreign Application Priority Data
Nov. 18, 2019 (EP) .................................... 19209829

(51) Int. Cl.
*G06F 9/455* (2018.01)
*G06F 11/34* (2006.01)
(52) U.S. Cl.
CPC ...... *G06F 9/45558* (2013.01); *G06F 11/3495* (2013.01); *G06F 2009/45591* (2013.01); *G06F 2009/45595* (2013.01)
(58) Field of Classification Search
CPC ............. G06F 9/45558; G06F 11/3495; G06F 2009/45591; G06F 2009/45595;
(Continued)

(56) References Cited

U.S. PATENT DOCUMENTS

2006/0265508 A1* 11/2006 Angel ................. H04L 61/2567
709/230
2017/0004012 A1 1/2017 Brown et al.
(Continued)

FOREIGN PATENT DOCUMENTS

WO 2021099774 A1 5/2021

OTHER PUBLICATIONS

"Extracting Data From vRealize Operations with the REST APSs," VMware Blogs, Feb. 4, 2019, pp. 1-13, by John Dias.*
(Continued)

*Primary Examiner* — Gregory A Kessler
(74) *Attorney, Agent, or Firm* — Bradley Arant Boult Cummings LLP; Adam J. Thompson, Esq.; Daniel E. Sineway, Esq.

(57) ABSTRACT

A system for monitoring server and application events, metrics or topology of an airport management system in a cloud infrastructure environment. The adapter can be coupled to a vROPS API of the cloud infrastructure environment and arranged to issue requests for data to the network via the vROPS API. The adapter can include a means for issuing multiple initial requests. The adapter can include a means for receiving initial responses to the multiple initial requests. The adapter can include a means for issuing multiple subsequent requests in response to each initial response. The adapter can include a means for receiving subsequent responses to the subsequent requests. The adapter can include a means for processing the subsequent responses related to each resource ID to provide events, metrics or topology information. The adapter can include a means for delivering the events, metrics or topology information to a user display system.

15 Claims, 13 Drawing Sheets

(58) Field of Classification Search
CPC ............... G06F 11/3006; G06F 11/301; G06F
11/3089; G06F 11/3476; G06F 9/541;
G08G 5/22
See application file for complete search history.

(56) References Cited

U.S. PATENT DOCUMENTS

| 2018/0157512 | A1* | 6/2018 | Savov | G06F 8/60 |
|---|---|---|---|---|
| 2018/0287914 | A1 | 10/2018 | Gupta | |
| 2018/0309637 | A1* | 10/2018 | Gill | H04L 41/40 |
| 2019/0129821 | A1 | 5/2019 | Lee et al. | |
| 2020/0034206 | A1* | 1/2020 | Dimitrov | G06F 9/5077 |
| 2021/0200566 | A1* | 7/2021 | Petkov | G06F 21/6254 |
| 2021/0359914 | A1* | 11/2021 | Savov | G06F 9/45558 |
| 2022/0286368 | A1* | 9/2022 | Savov | H04L 41/40 |

OTHER PUBLICATIONS

International Preliminary Report on Patentability for International Application No. PCT/GB2020/052935, mailed Jun. 2, 2022, 8 Pages.
International Search Report & Written Opinion, issued in International Application No. PCT/GB2020/052935, mailed Feb. 1, 2021 (completed: Jan. 20, 2021); 9 pages.
Vmware: "vRealize Operations Manager API Programming Guide", Oct. 11, 2018 (Oct. 11, 2018), XP055682517, Retrieved from the Internet: URL:https://docs.vmware.com/en/vRealize-Operations-Manager/7.0/vrealize-operations-manager-70-api-guide.pdf.
Extended European Search Report issued in Application No. 19209829. 1, dated Apr. 15, 2020.
Search Report issued in Singapore Application No. 11202204692W, filed on Nov. 18, 2020, dated Nov. 14, 2024 (3 pages).
VRealize Operations Manager API Programming Guide. Oct. 11, 2018 Wayback Machine at https://docs.vmware.com/en/vRealize-Operations-manager/7.0/vrealize-operations-manager-70-api-guide. pdf.
Examination Report issued in Indian Application No. 202217030845, dated Apr. 4, 2025 (7 pages).

* cited by examiner

OSSHub Cloud2 vROPS Integration

Cloud2 Intrastructure FRA

VROPS Server

API 443

CCN

API call flow

Cloud2 OSSHub vDCs SIN

Server/ vROPS Adapter

16

14

API Post request for data — 41

Poll wait

40

No

Data received

42

Yes

Collect data

43

Data Acquisition

44

Poll for supplementary data

45

Yes

No

Data storage

46

Data processing into Smarts topiology

47

Database storage

48

Web GUI User Display

49

SERVER AND APPLICATION MONITORING

CROSS REFERENCE TO RELATED APPLICATIONS

This application is a national phase application of, and claims benefit of and priority to International Application No. PCT/GB2020/052935, filed Nov. 18, 2020, entitled "SERVER AND APPLICATION MONITORING," which claims priority to European Application No. 19209829.1, filed Nov. 18, 2019, entitled "SERVER AND APPLICATION MONITORING," the disclosures of which are herein incorporated by reference as if set forth herein in their entireties.

FIELD OF THE INVENTION

The present application relates to monitoring of airport management systems and, in particular, to monitoring of such systems deployed in virtual environments.

BACKGROUND TO THE INVENTION

The airline industry relies on very large-scale computer networks of critical importance to airline operations and therefore to passenger safety as well as reliability of all parts of an end to end journey. Airport management systems include many disparate devices and services including those for management of flight data, airport resources, runway management, baggage control, kiosk control, flight information systems and more. A particular challenge with such arrangements is to integrate monitoring arrangements that operate effectively whilst providing simplified views to users.

An example of an existing system for monitoring airport management systems is referred to as the SITA Command Centre (SCC). The SCC uses a network monitoring technique referred to as Operational Support Systems Hub (OSSHub) which is a monitoring and service management platform. The SCC & internal/external customers use the SITA OSSHub tool set to monitor the SITA network, including airport management systems deployed on that network-.cloud. The OSSHub is a monitoring system and consists of several components, as shown in FIG. 1, to provide proactive fault, performance and configuration management. It is a tool used by SITA's SCC and internal/external customers, providing end-to-end views of devices & infrastructure in a single pane of glass.

SUMMARY OF THE INVENTION

We have appreciated the problem of monitoring of very large and complex networks and environments such as airport management systems and deploying monitoring tools for purposes of monitoring of events, metrics and topology when deployed in a virtual environment.

We have further appreciated that there are no adapters available to integrate specific types of infrastructure such as VMware vROPS manager in a cloud environment, in terms of events, performance and topology data into the tools that make up a monitoring system such as OSSHub.

The invention is defined in the independent claims to which reference should now be directed. Advantageous features are set out in the dependent claims.

In broad terms, the invention provides methods and apparatus to allow monitoring of servers and applications in cloud environments such as VMware.

In a first aspect, the invention described in this document provides an adapter integration by utilising an API, in particular the VMware vROPS (vRealize Operations) API, to pull events and metric data into a monitoring system, via new adapter(s).

The invention may be embodied in one or more adapters that provide functionality in one or more of three broad areas: events, topology and performance.

In the case of events, the adapter first pulls the event details such as, event name, event text and resource ID. The adapter then armed with resource ID, is arranged to re-read the API for host name, to supplement the event data required, for raising a correctly formatted event into the target monitoring system. Examples of such events include failure of devices such as baggage conveyors, kiosks, information boards or other hardware, application or software failures.

In terms of the topology acquisition instance, the adapter calls the API for data such as, hostname, vDC, Datacentre, vCentre & resource ID, and is configured to provide additional calls for further enrichment information based on the resource ID and primary calls which have taken place. The enriched data is then pushed into the monitoring system. The topology of an airport management system is a map of the whole infrastructure and includes hosts, routers, switches, data stores and virtual systems.

In the case of the performance management data, the adapter performs multiple API re-calls to gather the supplemental enrichment data to provide the metrics to populate graphed report(s). The metrics are subsequently pushed into the monitoring system. The metrics may relate to any aspect of performance of the airport management system and may be received as text and stored in a database.

Common to all data acquisition in the three broad areas, is that the primary API calls provide the initial "seed" (which consists of resource ID's) information, allowing the subsequent data to be collected. This approach addresses constraints that we have appreciated in relation to cloud systems that operate using virtual environments, namely a lack of access to the messages needed to monitor events, metrics or topology. The use of an initial request for resource IDs followed by subsequent requests allows the constraint of access to be overcome and thereby allow a monitoring system to gather the messages needed to perform the monitoring function.

BRIEF DESCRIPTION OF THE DRAWINGS

Embodiments of the invention will now be described, by way of example only, and with reference to the accompanying drawings, in which.

DETAILED DESCRIPTION

An embodiment of the invention provides a tool to facilitate monitoring of performance of an airport management system, in particular server and application performance.

The embodiment described provides various advantages by providing adapters for a particular environment. As an example, the embodiment allows a central visualisation and proactive fault management of an environment such as the cloud based SITA environment through existing tools used by an existing command centre for 24-hour monitoring.

Figure 2:
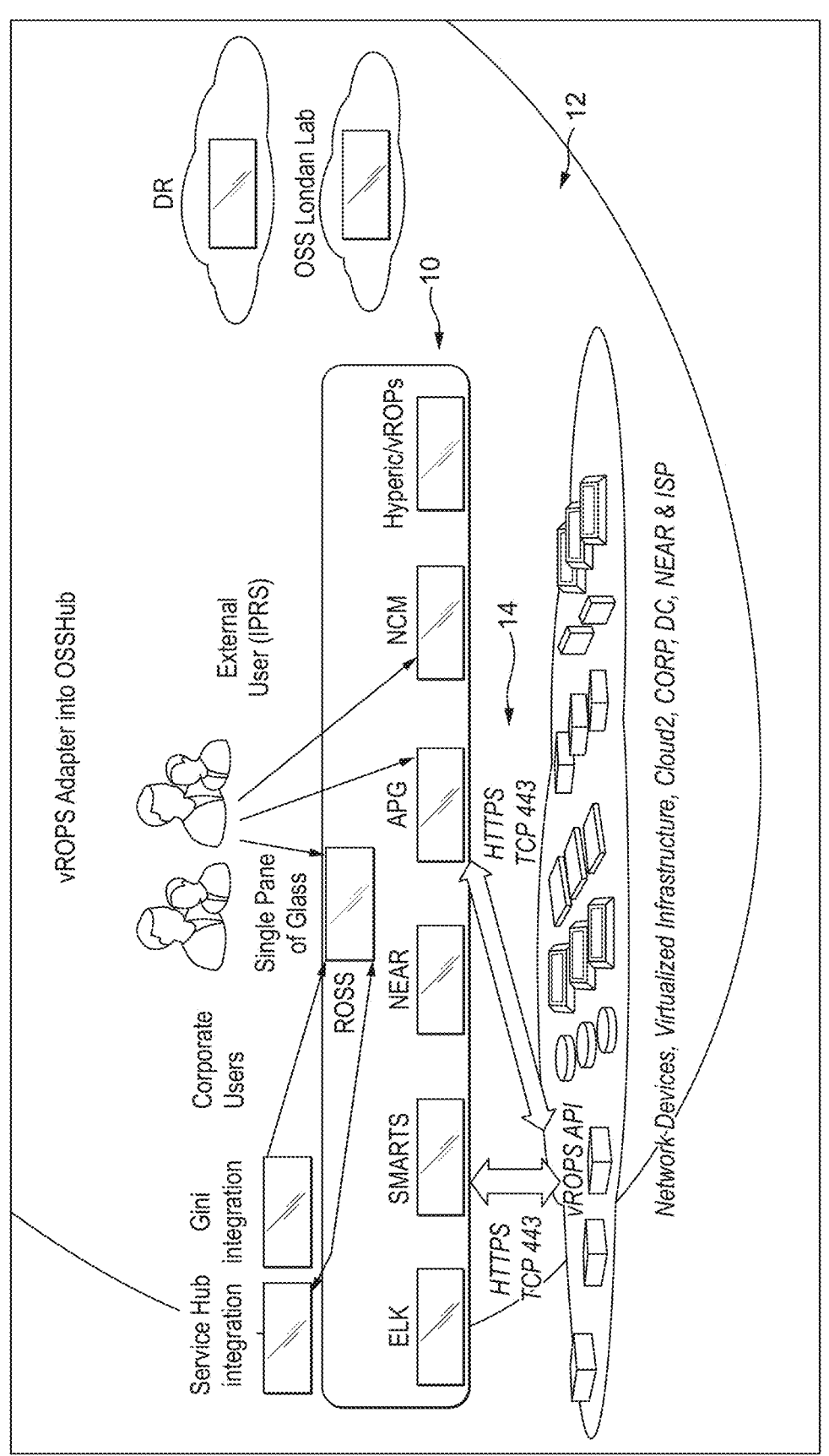
FIG. 2 shows at high level an adapter embodying the invention referred to as the vROPS adapter with the monitoring system SITA's OSSHub.

The embodiment of the invention focuses on the vROPS integration into VMware Smarts & APG products (FIG. 2). The adapter uses the TCP/IP protocol on port 443 to interrogate the vROPS API located in a cloud environment. Using REST API posts to issue commands to return required data. The invention could be applicable to other infrastructures.

The role of the adapters is important for providing proactive fault monitoring for customers hosted in the cloud infrastructure and feeding events of over 4000 hosts to the SITA SCC using OSSHub as their monitoring tool, where 24×7 support is provided.

In a particular use case, a customer may experience issues with their systems. Proactive monitoring may highlight systems becoming stressed, giving the operations time to remediate the issue before it became a system failure. Without using the adapters embodying the invention, this would not be possible.

The adapter provides the ability to trend system utilisation by way of APG (Advanced Performance Grapher) performance reports. This gives the advantage of analysing for future system resource requirements. This can be used in terms of CPU, memory & disk utilisation, highlighting potential system resource increases.

The embodiment described in relation to FIGS. 1 to 13 is one example, but in general the embodiment provides monitoring of servers and applications using an adapter to generate calls into a system via an API.

Figure 1:
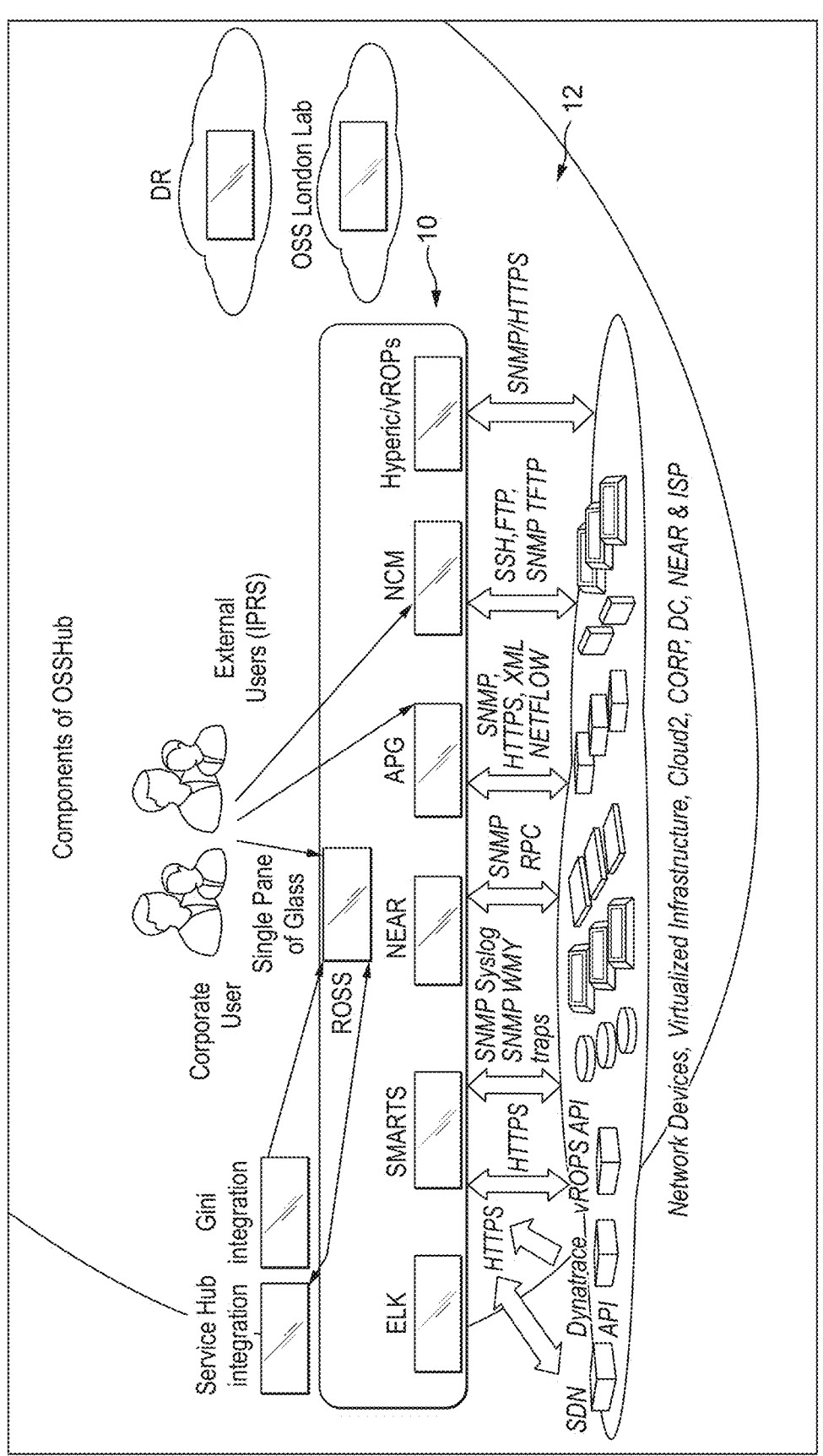
FIG. 1 is an overview of the high-level architecture of a monitoring system referred to as SITA's OSSHub.

FIG. 1 shows the main components of an arrangement to which the invention may be applied. A monitoring system 10 comprising a collection of tools is arranged to monitor a virtualised infrastructure 12 here deployed on a cloud environment. The monitoring system allows monitoring of the cloud infrastructure and virtual machines. Such an arrangement may have various connectivity to extract certain information from the virtualised infrastructure 12 to the monitoring system 10. However, as previously noted, the inventors appreciated that there are no adapters available to integrate certain specific aspects of virtualised infrastructure in order to provide effective monitoring of events and performance.

FIG. 2 shows the arrangement at FIG. 1 but now showing the use of an adapter embodying the invention arranged to pull events and metric data into the monitoring system OSSHub. The adapter 14 is shown schematically by the requests HTTPS/TCP/443 shown retrieving information via an API to VMware Smarts and APG. Smarts is the fault management sub-system & APG is the performance management system of the monitoring system 10. The invention could be applicable to other technologies. The processes provided by the adapter 14 will be described in greater detail later. The use of vROPS API is of particular note. VMware vRealize Operations (vROPS) is a tool that allows operations management from apps to infrastructure to optimize, plan and scale hybrid cloud and HCl deployments while unifying multi-cloud monitoring. However, we have appreciated that this tool may also be used as part of an external monitoring system, such as OSSHub, to facilitate monitoring of events, metrics or performance. This is achieved using an arrangement of initial requests and multiple subsequent requests as described below.

Figure 3:
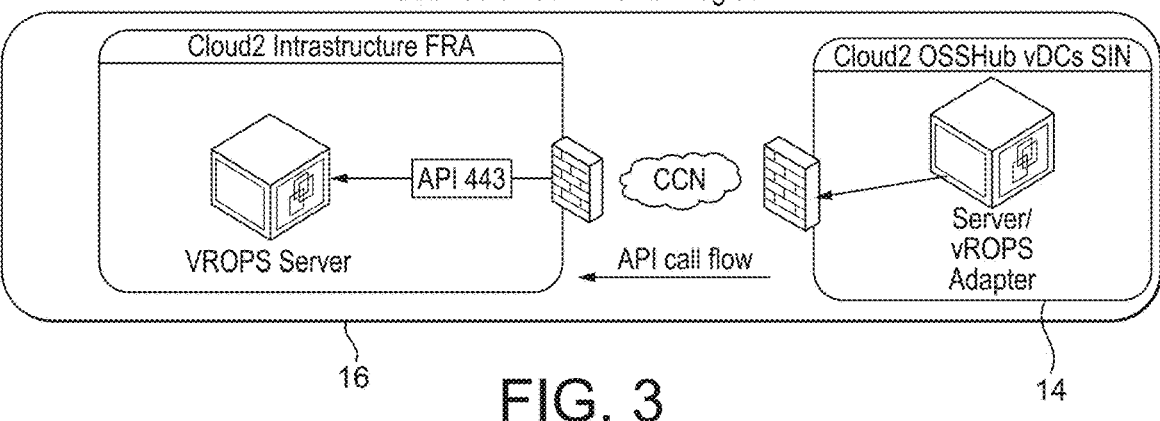
FIG. 3 shows the monitoring system OSSHub to Cloud 2 vROPS API connectivity using the adapter embodying the invention.

A specific example of an adapter connecting to an aspect of the cloud infrastructure is shown in FIG. 3. The adapter 14 is arranged to issue one or more API calls via a network to a specific server within the cloud infrastructure here shown as the vROPS server 16. The call is made on a particular port TCP/443. This arrangement provides security in that a specific port is selected and rendered accessible to the adapter 14 that is arranged to issue repeated API calls as described later. The adapter 14 may be deployed in various ways depending upon the aspect of the infrastructure to be monitored. A particular advantage of the adapter arrangement is the ability to gather data that may be used to gather Topology information for a network, event information for proactive fault management and performance metrics. As previously noted, come onto all of the use cases is the way in which one or more initial calls are supplemented by subsequent calls such that the adapter provides appropriate information to a monitoring system. In effect, the adapter allows the monitoring system to gather data needed for performance management using a vROPS API in a new manner by an arrangement of multiple requests. The reason for issuing multiple requests depends upon the nature of the resource being monitored. As an example, hardware such as a kiosk, hard disk, printer or the like may have multiple instances, each having their own unique resource ID. Multiple requests may be needed to gather data collectively from the multiple instances. A key reason for issuing multiple requests, though, is that the initial request may provide insufficient data and so a determination is made to issue further requests in relation to the same resource ID.

Figure 4:
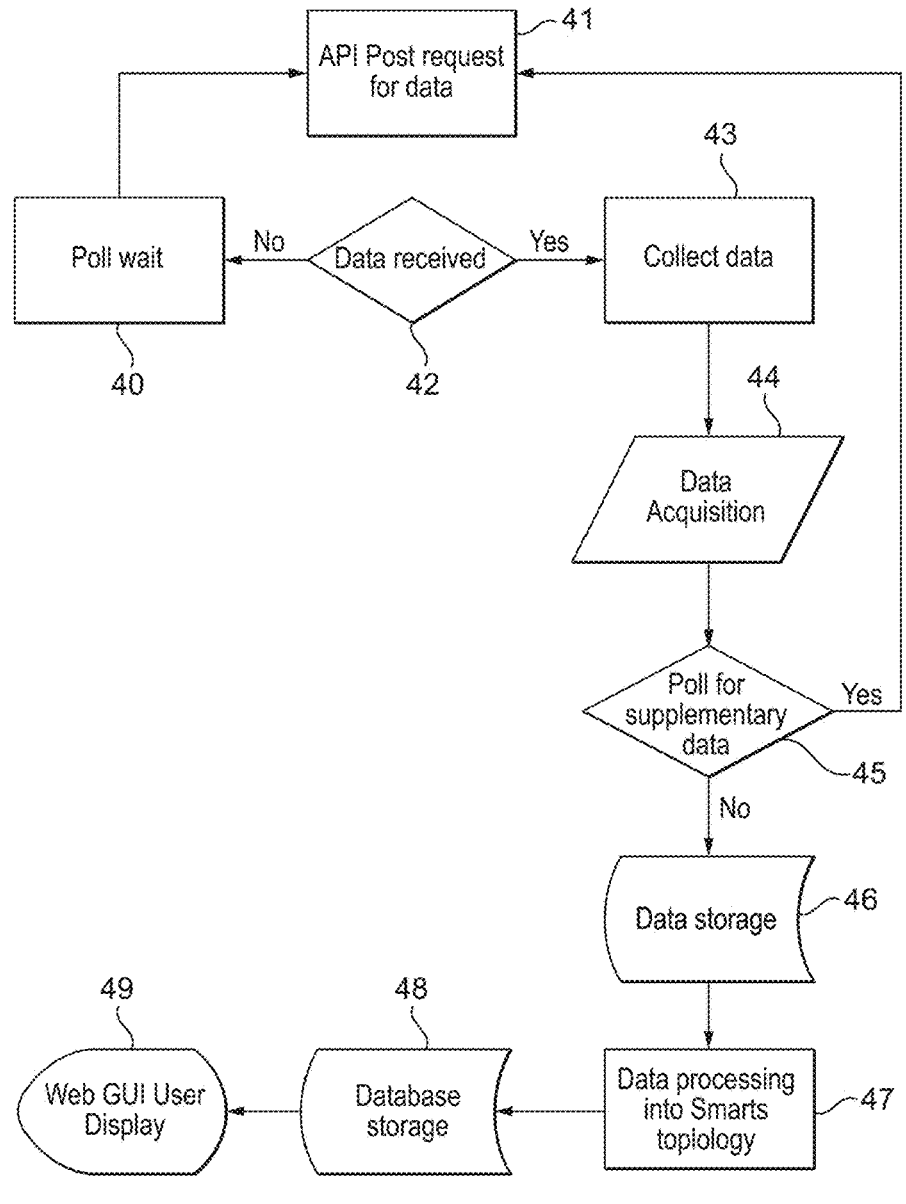
FIG. 4 shows Smarts topology Data flow diagram.
Figure 5:
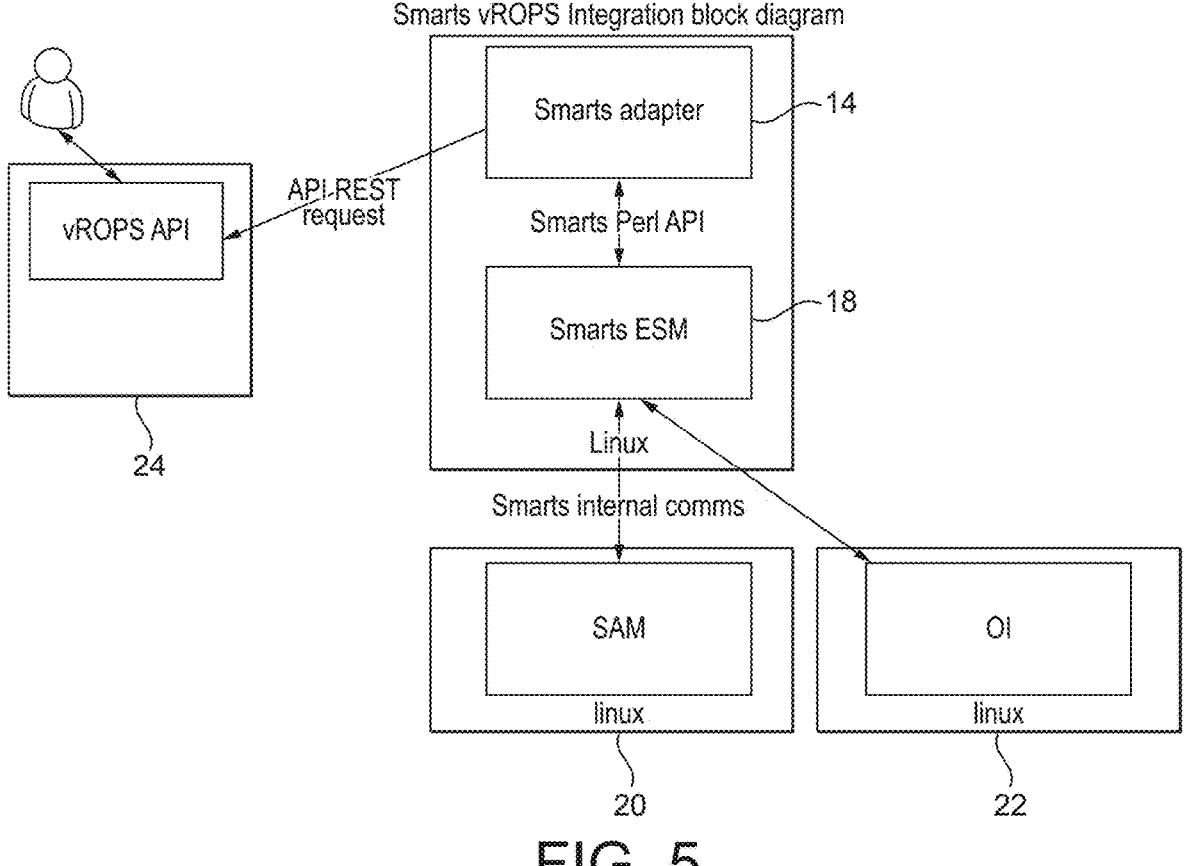
FIG. 5 shows the architecture of SITA Smarts vROPS topology adapter embodying the invention.
Figure 6:
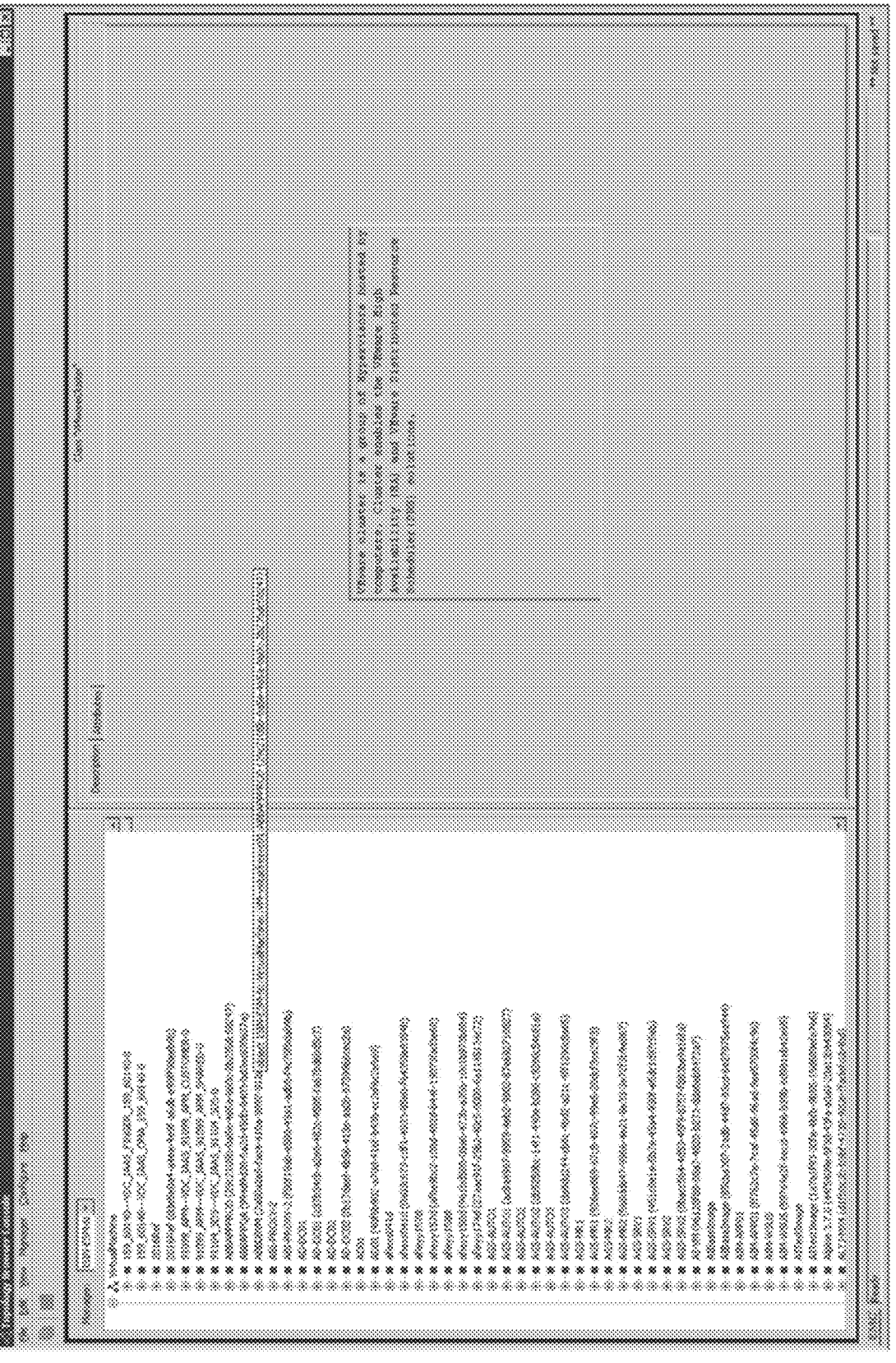
FIG. 6 shows events referred to as ROSS events as seen by the SITA command centre SCC when using the invention.

The arrangement of an adapter to monitor Topology will first be described with relation to FIGS. 4 and 5. FIG. 4 shows a flow diagram of the arrangement whilst FIG. 5 is a block diagram of the main components. As shown in FIG. 5, the adapter for the specific scenario of Topology information referred to as Smarts adapter 14, can explore an API deployed using Smarts Perl to a Smarts ESM (EMC Server Manager) 18 and in turn to SAM 20 and OI 22. SAM is Service Assurance Manager or event aggregator & console OI is Open Integration platform or integration point to gather data from other sources These are both aspects of the monitoring system 10. The adapter 14 also connects via the vROPS API 24 to provide information to the monitoring system. In this way, the adapter 14 uses the API 24 as part of the arrangement to gather information. The API command used may be a REST API command that gathers properties as follows:

Topology properties are gathered via REST API command:

https://host/suite-api/api/resources/${resource_id}/properties
summary|parentDatacenter
summary|parentCluster
summary|parentVcenter
summary|parentHost
ops:property|ip_address
ops:propertyconfig|guestFullName
Additional topology data is acquired via REST API post:
https://host/suite-api/api/resources?resourceKindKey=VirtualMachine&pageSize=-1
getAttribute|identifier
ops:resourceKindKey
ops:name The process operated by the adapter 14 of FIG. 5 is shown in FIG. 4. At step 40 the adapter waits to determine whether data is received at step 42 from any previous request. If data is determined to be received at determining step 42 then data is collected at step 43, acquired at step 44 and a determination made at determining step 45 as to whether a poll for supplementary data is required. If supplementary data is required, then a further request for data is made. if no further data is needed then the data received is provided to data storage 46 processed into Smart step Topology data at step 47 stored in database 48 and then provided to a user interface at step 49. If it is determined that further data is needed at step 45 then a further poll for data is issued by the API at step 41 and the adapter then waits to determine if data is received at step 42. The loop provided by the initial request for data and supplementary request for data determined at step 45 provides the advantage that the adapter performs the function of aggregating data so as to provide information to the monitoring system. An example of the view of information received is shown in FIG. 6 which shows Topology information passed into Smarts ESM Extended Server Manager and used in the Smarts Topology view.

Figure 7:
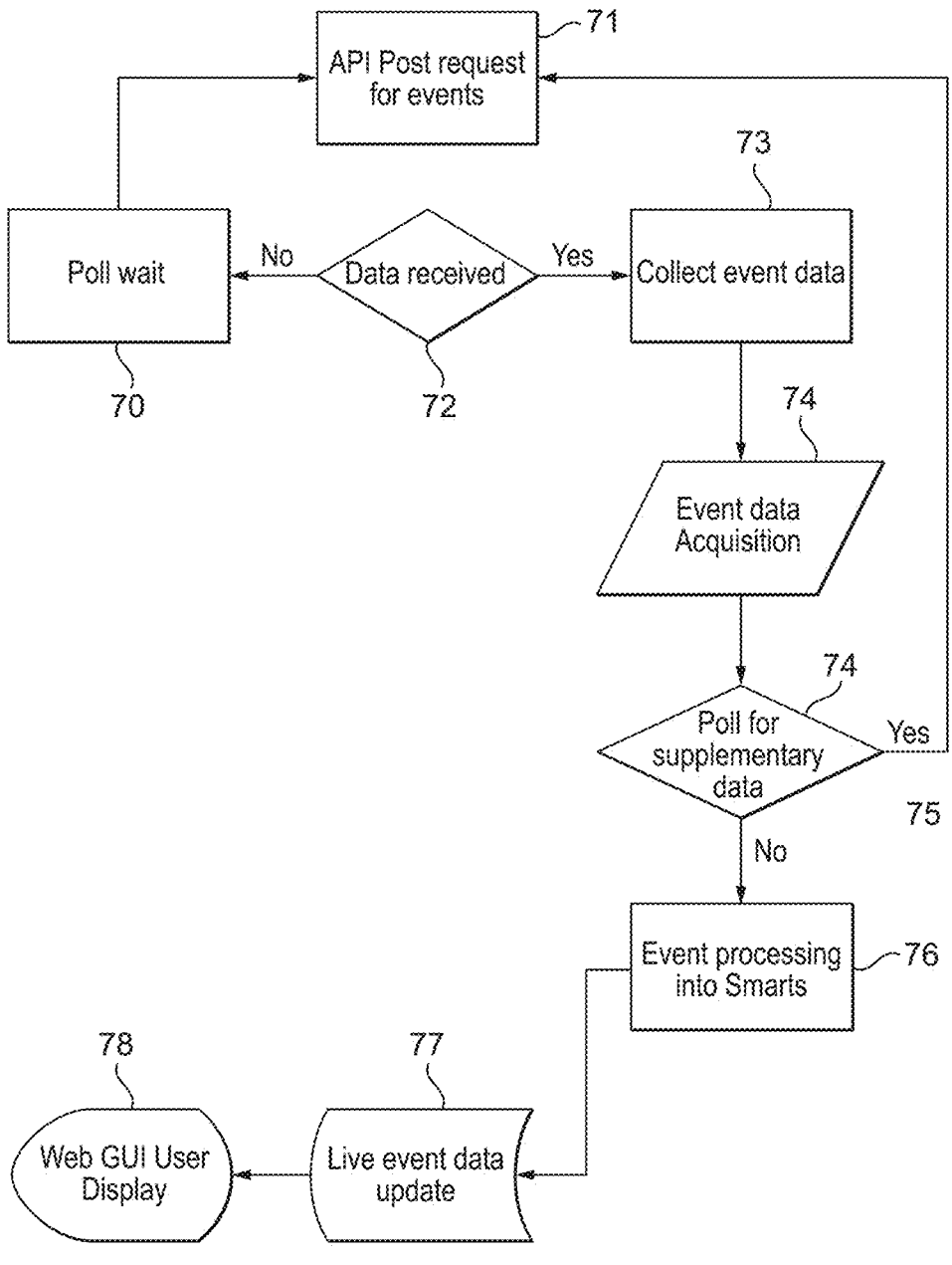
FIG. 7 shows Smarts events data flow diagram.
Figure 8:
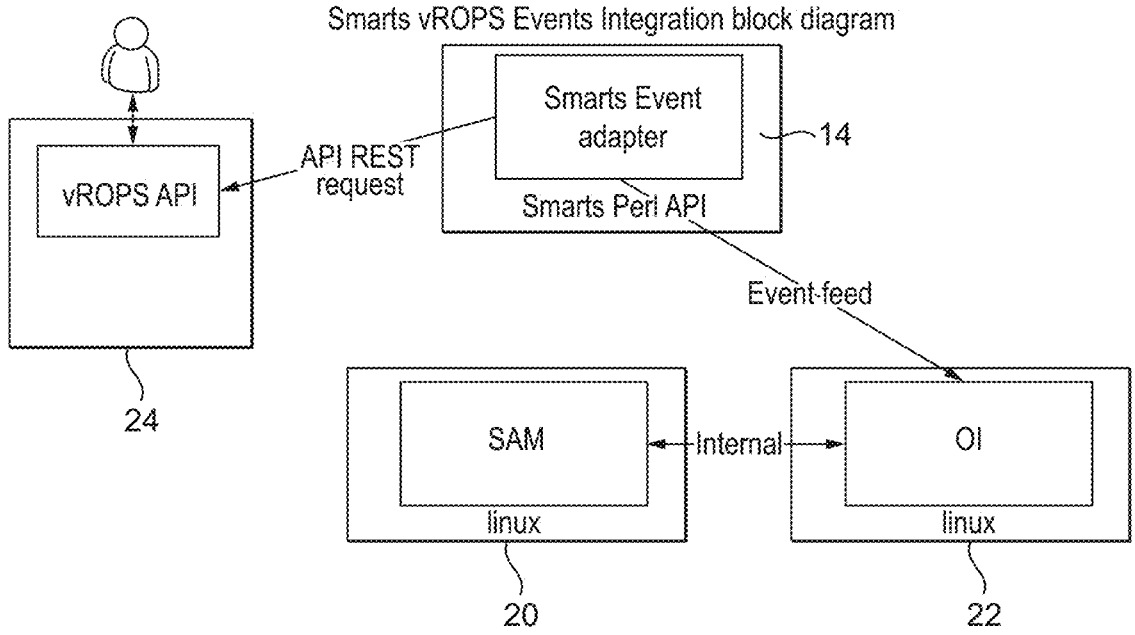
FIG. 8 shows the architecture of SITA Smarts vROPS using an events adapter embodying the invention.

An adapter arranged for event gathering for performance management is described in relation to FIGS. 7 and 8. Like components are given the same numbering as previously described. Here, the adapter 14 deployed as a Smarts events adapter connects to SAM 20 and OI 22 and also to vROPS API 24. The gathering process for events is shown in FIG. 7. At an initial wait step 70 the adapter waits to see if data is received from a previous request at determining step 72. After the wait a request is issued at step 71 for events. If data is received at step 72 then the event data is collected at step 73 and acquired at step 74. At determining step 75 a determination is made whether supplementary data is needed. If yes, then a further request is issued and the process repeated. If not then the data acquired at step 74 is passed to event processing in Smarts at step 76 and stored in a live data update store at step 77 for display on a user display 78. As with the previous example, the loop provided by acquisition of data repeatedly provides appropriate and useful information to the monitoring system by aggregating event information together.

Figure 9:
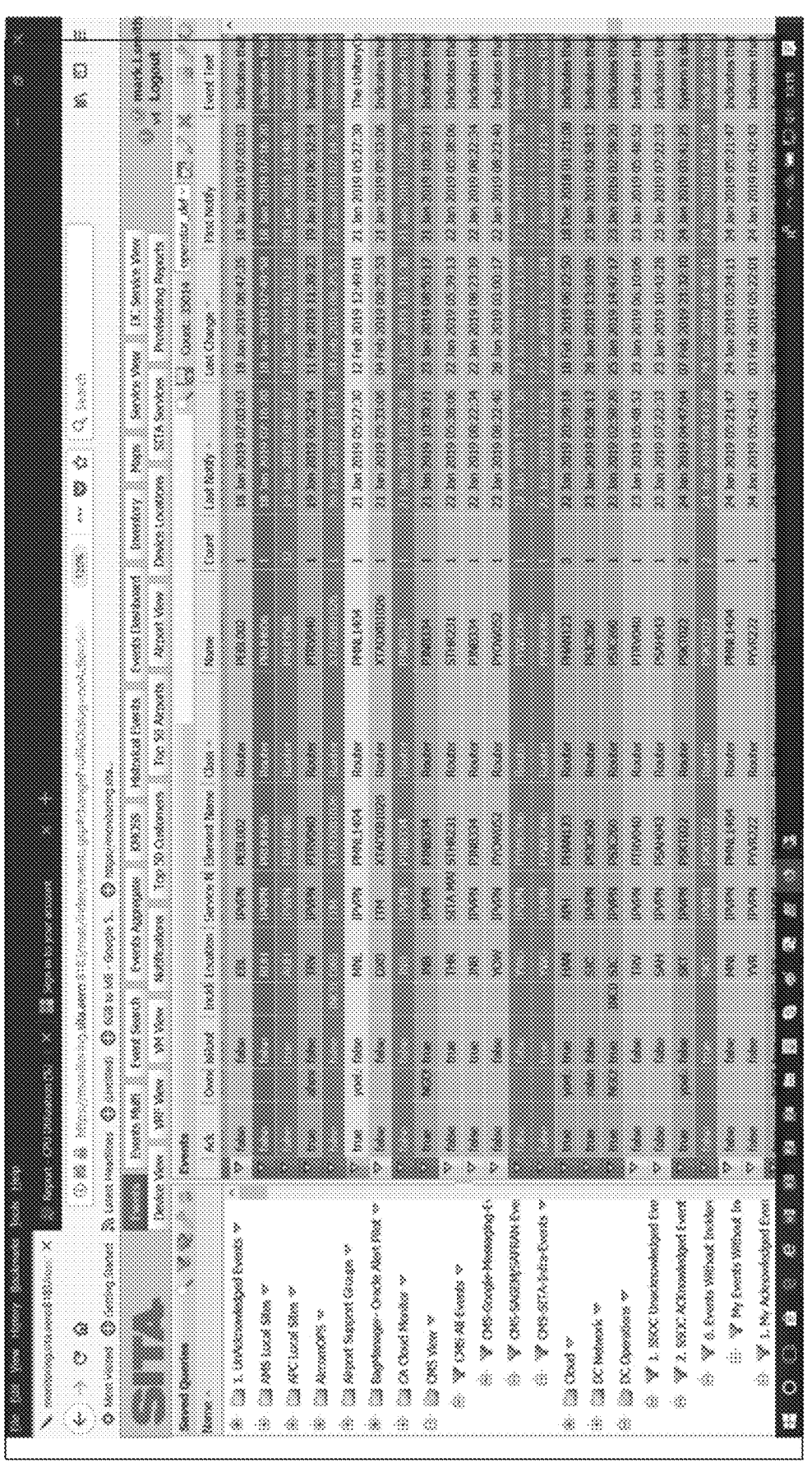
FIG. 9 shows ROSS events view as seen by the SITA command centre SCC when using the invention.

An example display of the event view provided by the information gathered by the event adapter is shown in FIG. 9.

To gather the event information alerts are interrogated via REST API command:

https://host/suite-api/api/alerts/query
API call payload:
<ops:alert-query compositeOperator=\"AND\"
xmlns:xs=\"http://www.w3.org/2001/XMLSchema\"
xmlns:xsi=\"http://www.w3.org/2001/XMLSchema-instan -continued ce\" xmlns:ops=\"http://webservice.vmware.com/vRealizeOpsMgr/1.0/\">
        <ops:alertId></ops:alertId>
        <ops:resource-query>
        <ops:resourceId>${resource_id}</ops:resourceId>
        <ops:statKeyInclusive>true</ops:statKeyInclusive>
        </ops:resource-query>
        <ops:activeOnly>true</ops:activeOnly>
    >ops:alertCriticality>
        <ops:alertCriticality>CRITICAL</ops:alertCriticality>
        <ops:alertStatus></ops:alertStatus>
        <ops:alertImpact></ops:alertImpact>
        <ops:alertControlState></ops:alertControlState>
<ops:includeChildrenResources>true</ops:includeChildrenResources>
        </ops:alert-query>

Figure 10:
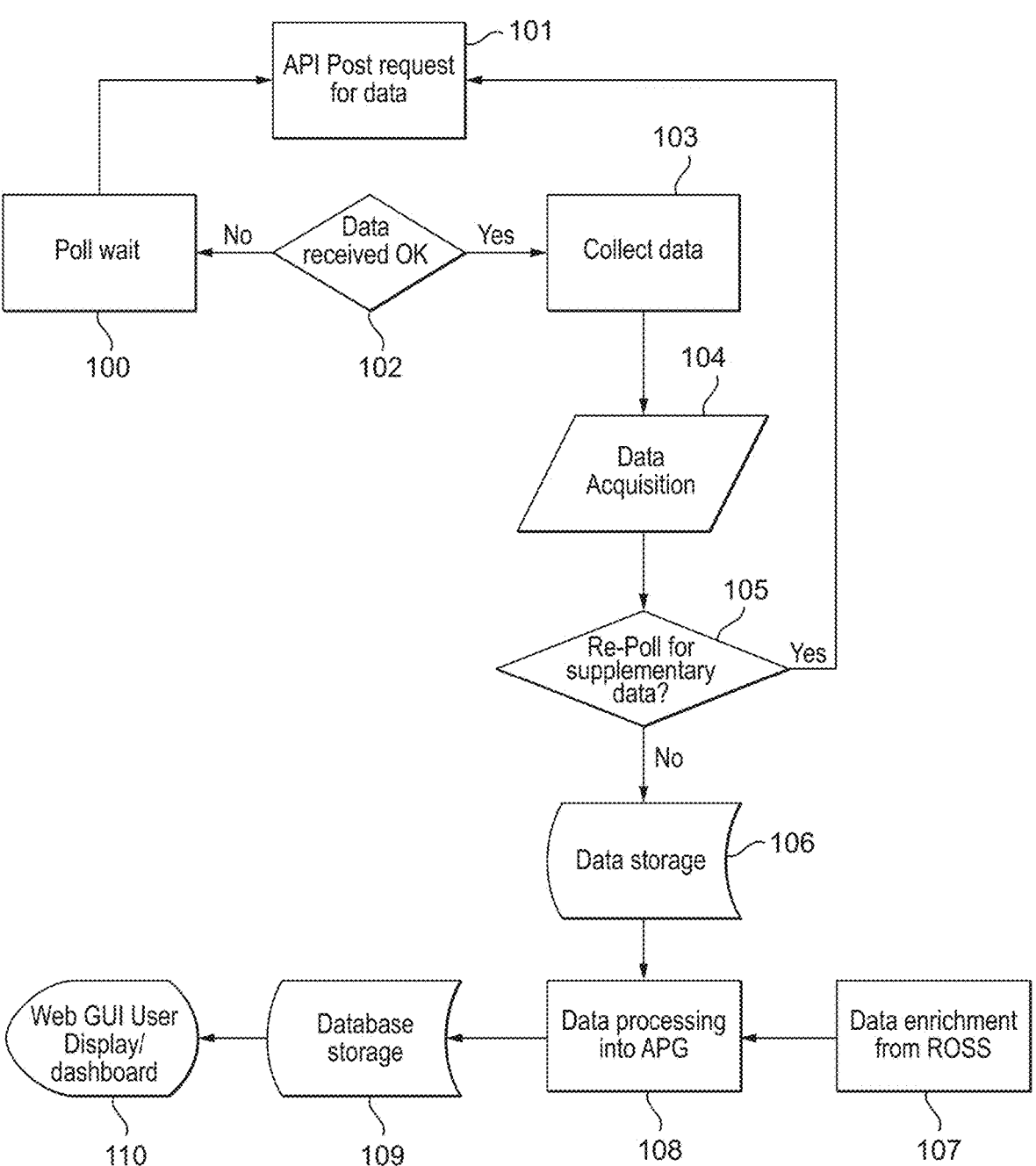
FIG. 10 shows the performance metrics, APG/M&R metrics, data flow diagram.
Figure 11:
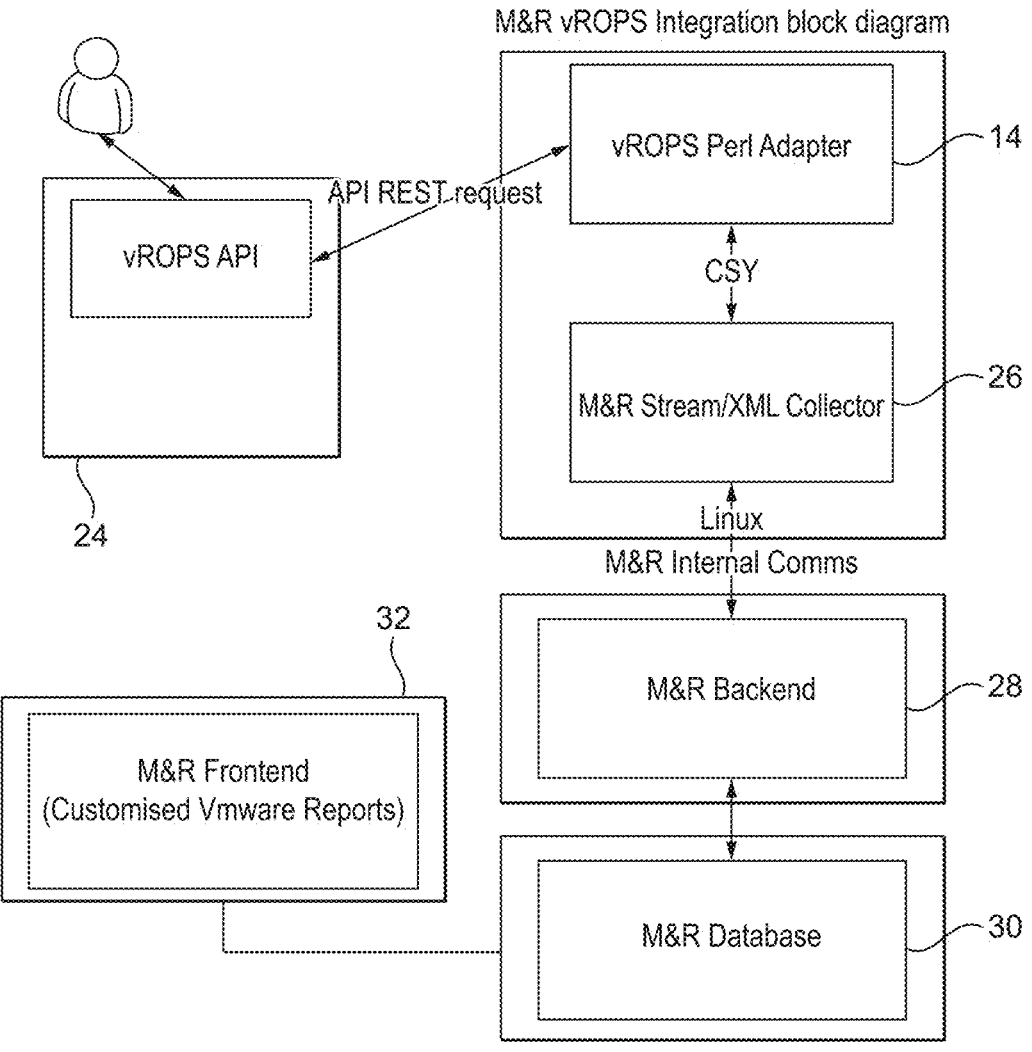
FIG. 11 shows the architecture of SITA VMware APG vROPS performance metrics adapter embodying the invention.

The third example of data gathering provided by the API is shown in FIGS. 11 and 10. As shown in FIG. 11, an adapter 14 is arranged to gather information and provided via API 24 to the user in the form of the monitoring system. The adapter 14 connects to an M&R stream collector 26 which in turn connects to an M &R backend 28 and an M& R database 30. The database is also accessible by an M& R frontend 32. M & R (Monitoring & Reporting) Stream XML collector module provides the direct interface from the TCP/IP data stream, the backend module, takes the data from the XML collector and processes to subsequently add the data into the database module. M & R Frontend module provides the user presentation display.

FIG. 10 shows the process for gathering the performance metrics using the adapter. At step 100 the adapter waits to see if data is received from a previous request at step 102. If data is required, then a request is posted via API at step 101. If data is received as determined at step 102 it is collected at step 103 and acquired at step 104. At step 105 a determination is made as to whether to poll for supplementary data. If yes, then a further request is issued at step 101 and the process repeated including waiting at step 100 and determining if further data is received at step 102. If no further data is required then the data acquired at step 104 is then passed to storage 106 and processed into APG at step 108. The processing into APG is a built in XML adapter pushing the data gathered through the API into the Datastore. Any supplementary enrichment data from ROSS (Rapid Operational Support System—single pain of glass view operational console for SCC which holds all the multitenant and model information) is received at step 107 and the data thus acquired provided to database storage 109 and subsequently to a user display on the monitoring system at step 110.

To Gather Data

Virtual Machine Metrics:

Metrics are gathered via several API commands:

```
https://host/suite-api/api/resources/stats/latest?resourceId=${resource_id}
https://host/suite-api/api/resources?resourceKindKey=VirtualMachine&pageSize=-1
https://host/suite-api/api/resources/$(resource_id)/properties
/suite-api/api/resources/${resource_id}/relationships
```

As with the two prior examples, the repeated request and re-request is important in gathering the information needed for the monitoring system.

Figure 12A:
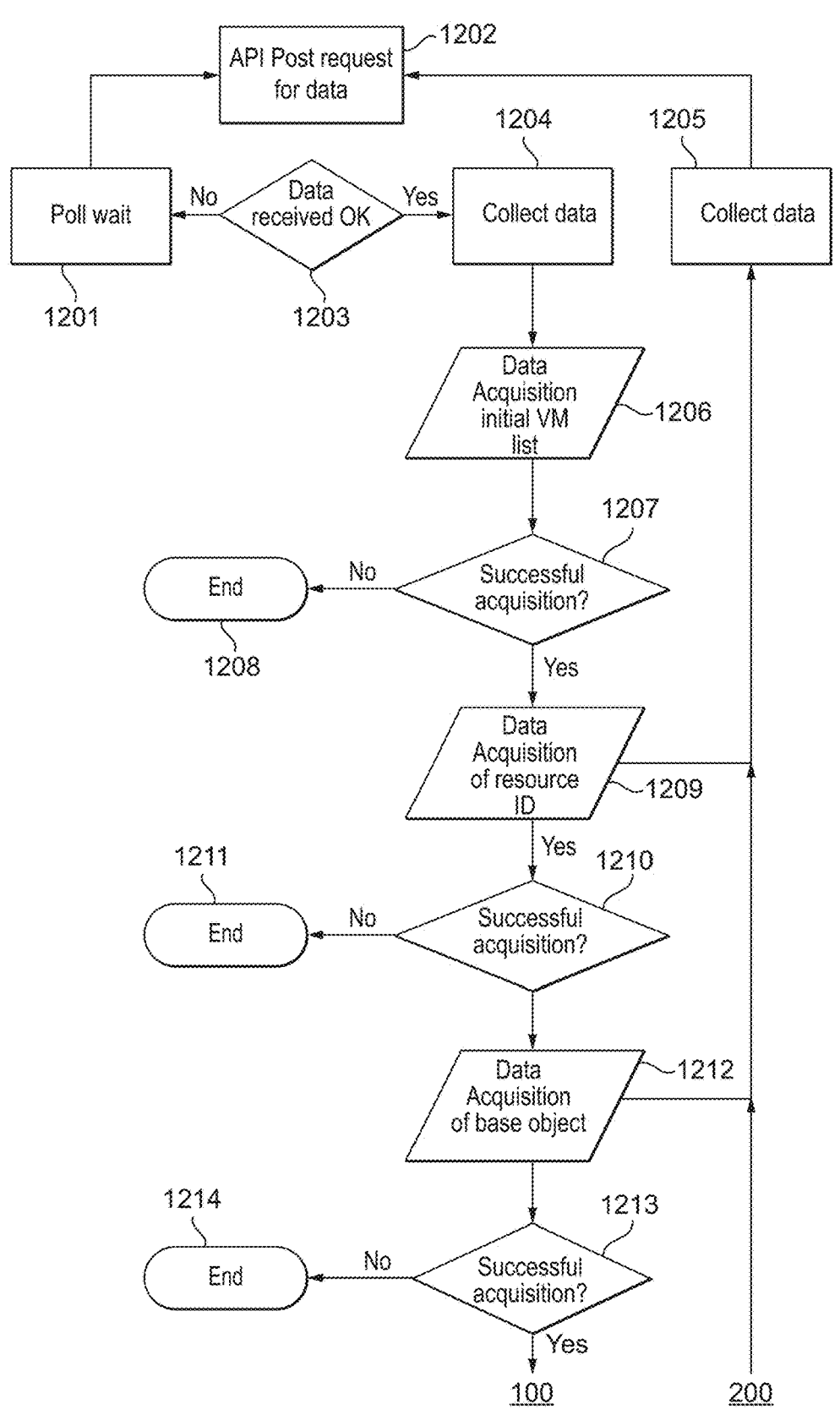
FIGS. 12A and 12B are flow diagrams showing an example process for obtaining CPU metrics.
Figure 12B:
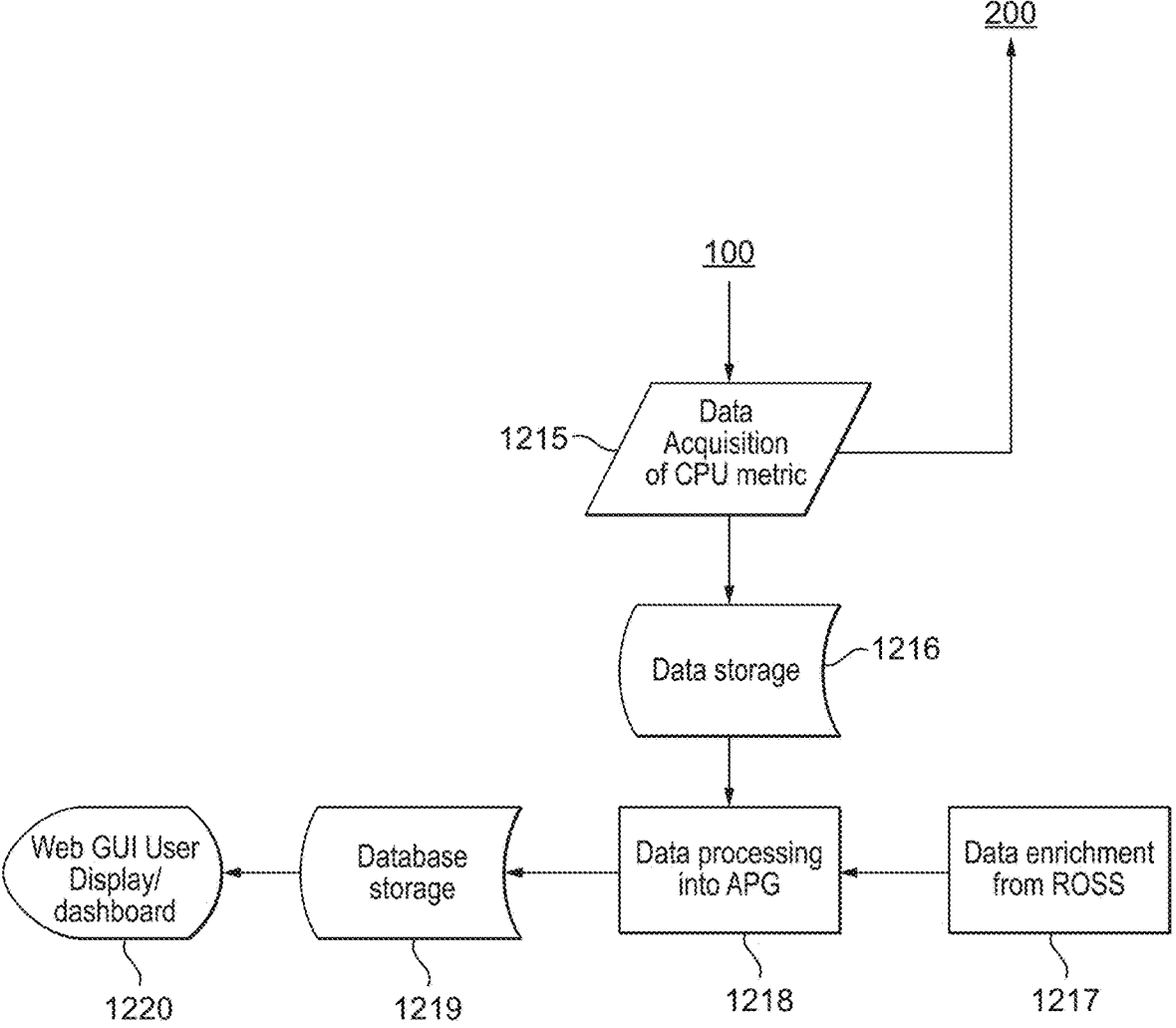

A worked example showing the specifics of initial acquisition and subsequent acquisitions common to all three of the examples above is shown in FIG. 12. The adapter is arranged to initially wait for a period at step 1201 to then receive data from any previous requests at step 1202. At determining step 1203 a check is repeatedly made as to whether data is received. If yes, the data is collected at step 1204. An initial acquisition of data is performed at step 1206 being the acquisition in response to an initial request. If the data acquisition is deemed successful at step 1207 then no further request is needed and the process ends at step 1208. However, more typically the information received in an initial request will not be sufficient and for that purpose the event has a processing loop to issue a further request using the resource ID of the event just acquired at step 1209. Data is collected at step 1205 to re-request another instance or more data, and the request for data posted to the API at step 1202. This loop is repeated for multiple initial requests and subsequent requests related to the initial requests using the resource ID as a mechanism to gather further data related to each event. At step 1210 if it is deemed at decision step 1210 that acquisition has been successful the process ends at 1211. If it is determined that further information is needed on a base object then step 1212 causes a further request to be issued. The base object can be the sub-object of the host VM, which again uses the resource ID to pull the correct associated object data. At step 1213 may be determined that acquisition of data has been completed and the process ends at step 1214. On the other hand, if further information is required in relation to CPU metrics at step 1215, a further request may be issued to collect data at step 1205 and an API request is viewed at step 1202. This causes the loop to repeat. Finally, at step 1216 the data received by the initial request and any subsequent requests is gathered and processed into APG at step 1218 and any additional enrichment data from ROSS is gathered at step 1217. Finally, the event details and additional data relating to each resource ID is gathered in database storage 1219 to provide to the monitoring system by way of a user interface or dashboard at 1220.

As can be seen from the specific example of FIG. 12, the system embodying the invention uses an adapter that issues multiple initial requests and multiple subsequent requests in response to each initial response to an initial request, to aggregate information together using the resource ID of information provided in response to an initial request. In this way, the adapter cannot simply provide the events to the monitoring system but actually aggregates information together in a way that the monitoring system can then process.

Figure 13:
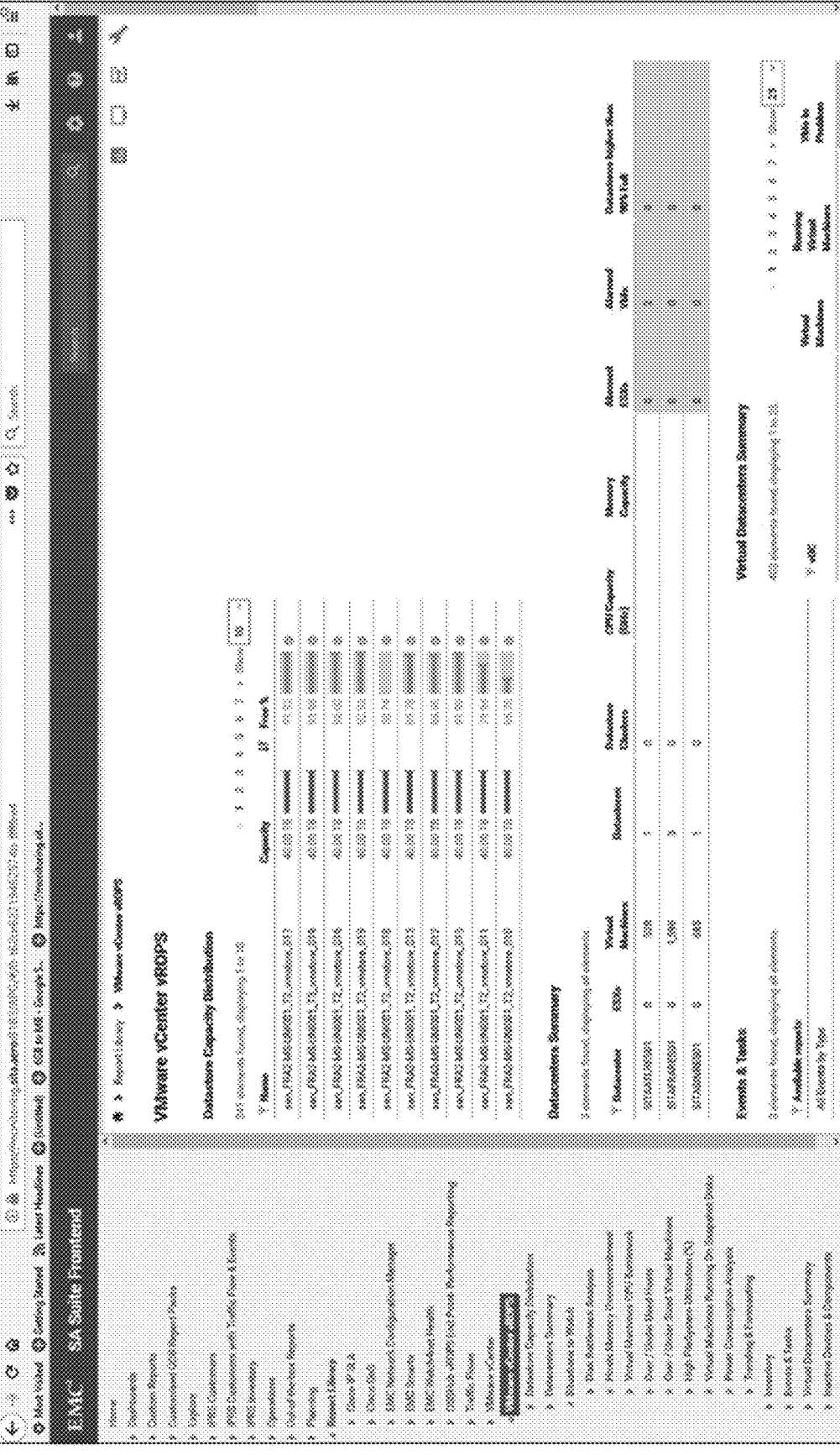
FIG. 13 shows an illustration of data presented in APG to a user.

FIG. 13 shows how performance metrics may be displayed as a result of the operation of the processes embodying the invention.

Further features of embodiments of the invention are set out on the following clauses:

1. A system for monitoring server and application events, metrics or topology of a an airport management system in a cloud infrastructure environment, comprising:

an adapter configured to couple to a vROPS API of the cloud infrastructure environment and arranged to issue requests for data to the network via the vROPS API, wherein the adapter includes:

means for issuing multiple initial requests, each initial request being for resource IDs of resources;

means for receiving initial responses to the multiple initial requests, each initial response including at least resource IDs of the resources;

means for issuing multiple subsequent requests in response to each initial response, each subsequent request including one of the resource IDs and being for additional data;

means for receiving subsequent responses to the subsequent requests, the subsequent responses including the resource ID and additional data;

means for processing the subsequent responses related to each resource ID to provide events, metrics or topology information; and means for delivering the events, metrics or topology information to a user display system.

2. A system according to clause 1, wherein the initial requests are for events and are for resource IDs and event IDs.

3. A system according to clause 2, wherein the additional data comprises event details comprising one or more of host name, event name or event text.

4. A system according to clause 1, 2 or 3, wherein the initial requests are for performance information and are for resource IDs and details of virtual machines of the computer network.

5. A system according to clause 4, wherein the additional data comprises objects of the virtual machines.

6. A system according to clause 5, wherein the additional data comprises metrics of the objects.

7. A system according to clause 6, wherein the means for issuing multiple subsequent requests includes means for querying a list of objects on the cloud infrastructure environment and issuing the subsequent requests based on the list of objects.

8. A system according to any preceding clause, wherein the initial requests are for topology information and are for resource IDs and details of virtual machines of the cloud infrastructure environment.

9. A system according to clause 8, wherein the additional data comprises information related to the virtual machines.

10. A system according to clause any preceding clause, wherein the requests are issued as multiple threads to the cloud infrastructure environment such that multiple requests are handled in parallel.

11. A method for monitoring server and application events, metrics or topology of an airport management system in a cloud infrastructure environment, comprising:

operating a request process to a vROPS API of the cloud infrastructure environment, wherein the request process includes:

issuing multiple initial requests, each initial request being for resource IDs of resources;

receiving initial responses to the multiple initial requests, each initial response including at least resource IDs of the resources;

issuing multiple subsequent requests in response to each initial response, each subsequent request including one of the resource IDs and being for additional data;

receiving subsequent responses to the subsequent requests, the subsequent responses including the resource ID and additional data;

processing the subsequent responses related to each resource ID to provide events, metrics or topology information; and delivering the events, metrics or topology information to a user display system.

12. A method according to clause 11, wherein the initial requests are for events and are for resource IDs and event IDs.

13. A method according to clause 12, wherein the additional data comprises event details comprising one or more of host name, event name or event text.

14. A method according to clause 11, 12 or 13, wherein the initial requests are for performance information and are for resource IDs and details of virtual machines of the computer network.

15. A method according to clause 14, wherein the additional data comprises objects of the virtual machines.

16. A method according to clause 15, wherein the additional data comprises metrics of the objects.

17. A method according to clause 16, wherein the issuing multiple subsequent requests includes querying a list of objects on the cloud infrastructure environment and issuing the subsequent requests based on the list of objects.

18. A method according to any of clauses 11 to 17, wherein the initial requests are for topology information and are for resource IDs and details of virtual machines of the cloud infrastructure environment.

19. A method according to clause 18, wherein the additional data comprises information related to the virtual machines.

20. A method according to of clauses 11 to 19, wherein the requests are issued as multiple threads to the cloud infrastructure environment such that multiple requests are handled in parallel.

21. A computer program comprising code which when executed on a computer undertakes the method of any of clauses 11 to 20.

The invention claimed is:

1. A system for monitoring server and application events, metrics or topology of an airport management system in a cloud infrastructure environment, comprising:

an adapter configured to couple to a vRealize Operations (vROPS) Application Programming Interface (API) of the cloud infrastructure environment and arranged to issue requests for data to the network via the vROPS API, wherein the adapter is further configured to:

issue multiple initial requests, each initial request being for resource IDs of resources;

receive initial responses to the multiple initial requests, each initial response including at least resource IDs of the resources;

issue multiple subsequent requests in response to each initial response, each subsequent request including one of the resource IDs and being for additional data;

receive subsequent responses to the subsequent requests, the subsequent responses including the resource ID and additional data;

aggregate the initial responses and the subsequent responses related to each resource ID to provide events, metrics or topology information; and deliver the events, metrics or topology information to a user display system.

2. The system according to claim 1, wherein the initial requests are for events and are for resource IDs and event IDs.

3. The system according to claim 2, wherein the additional data comprises event details comprising one or more of host name, event name or event text.

4. The system according to claim 1, wherein the initial requests are for performance information and are for resource IDs and details of virtual machines of the computer network.

5. The system according to claim 4, wherein the additional data comprises objects of the virtual machines.

6. The system according to claim 5, wherein the additional data comprises metrics of the objects.

7. The system according to claim 6, wherein issuing multiple subsequent requests includes querying a list of objects on the cloud infrastructure environment and issuing the subsequent requests based on the list of objects.

8. The system according to claim 1, wherein the initial requests are for topology information and are for resource IDs and details of virtual machines of the cloud infrastructure environment.

9. The system according to claim 8, wherein the additional data comprises information related to the virtual machines.

10. The system according to claim 1, wherein the requests are issued as multiple threads to the cloud infrastructure environment such that multiple requests are handled in parallel.

11. A method for monitoring server and application events, metrics or topology of an airport management system in a cloud infrastructure environment, comprising:

operating a request process to a vRealize Operations (vROPS) Application Programming Interface (API) of the cloud infrastructure environment, wherein the request process includes:

issuing multiple initial requests, each initial request being for resource IDs of resources;

receiving initial responses to the multiple initial requests, each initial response including at least resource IDs of the resources;

issuing multiple subsequent requests in response to each initial response, each subsequent request including one of the resource IDs and being for additional data;

receiving subsequent responses to the subsequent requests, the subsequent responses including the resource ID and additional data;

aggregating the initial responses and the subsequent responses related to each resource ID to provide events, metrics or topology information; and delivering the events, metrics or topology information to a user display system.

12. The method according to claim 11, wherein the initial requests are for events and are for resource IDs and event IDs.

13. The method according to claim 12, wherein the additional data comprises event details comprising one or more of host name, event name or event text.

14. The method according to claim 11, wherein the initial requests are for performance information and are for resource IDs and details of virtual machines of the computer network.

15. A non-transitory computer-readable medium storing instructions which when executed on a computer undertakes the method of claim 11.

\* \* \* \* \*

12